United States Patent
Ikenishi

(10) Patent No.: US 8,476,176 B2
(45) Date of Patent: Jul. 2, 2013

(54) PHOSPHATE GLASS, FLUOROPHOSPHATE GLASS, PREFORM FOR PRECISION PRESS-MOLDING, OPTICAL ELEMENT AND PROCESS FOR THE PRODUCTION OF THEREOF

(75) Inventor: Mikio Ikenishi, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/443,933

(22) Filed: Apr. 11, 2012

(65) Prior Publication Data

US 2012/0258848 A1 Oct. 11, 2012

Related U.S. Application Data

(62) Division of application No. 12/306,777, filed as application No. PCT/JP2007/063535 on Jun. 29, 2007, now Pat. No. 8,183,169.

(30) Foreign Application Priority Data

Jul. 3, 2006 (JP) ................................ 2006-183223

(51) Int. Cl.
  *C03C 3/247* (2006.01)
(52) U.S. Cl.
  USPC ............................................... 501/44; 501/45
(58) Field of Classification Search
  USPC .................................................... 501/43–48
  See application file for complete search history.

(56) References Cited

U.S. PATENT DOCUMENTS

| | | | |
|---|---|---|---|
| 4,226,628 A | 10/1980 | Bartholomew et al. | |
| 4,314,031 A | 2/1982 | Sanford et al. | |
| 4,405,724 A | 9/1983 | Tick | |
| 4,426,430 A | 1/1984 | Tick | |
| 4,615,989 A | 10/1986 | Ritze | |
| 5,068,209 A | 11/1991 | Meinert et al. | |
| 5,750,448 A | 5/1998 | Grabowski et al. | |
| 5,755,998 A | 5/1998 | Yamazaki et al. | |
| 6,284,685 B1 | 9/2001 | Borrelli et al. | |
| 8,080,490 B2 * | 12/2011 | Fechner et al. | 501/24 |
| 8,198,202 B2 * | 6/2012 | Ikenishi | 501/44 |
| 2004/0023786 A1 | 2/2004 | Ellison et al. | |
| 2005/0159291 A1 * | 7/2005 | Ritter et al. | 501/48 |
| 2005/0188724 A1 | 9/2005 | Ikenishi et al. | |
| 2005/0233888 A1 * | 10/2005 | Seneschal et al. | 501/45 |
| 2006/0065019 A1 * | 3/2006 | Kolberg et al. | 65/99.4 |
| 2006/0166806 A1 * | 7/2006 | Fechner et al. | 501/45 |
| 2007/0099787 A1 * | 5/2007 | Hayden et al. | 501/48 |
| 2009/0298668 A1 | 12/2009 | Ikenishi | |

FOREIGN PATENT DOCUMENTS

| | | |
|---|---|---|
| JP | 2-283635 | 11/1990 |
| JP | 3-500162 | 1/1991 |
| JP | 07157330 A | 6/1995 |
| JP | 9-202642 | 8/1997 |
| JP | 2004-352604 | 12/2004 |
| JP | 2005-75687 | 3/2005 |
| JP | 2005-247659 | 9/2005 |
| WO | WO 2004076371 A2 * | 9/2004 |

OTHER PUBLICATIONS

International Search Report for PCT/JP2007/063535 mailed Aug. 14, 2007.
Written Opinion for PCT/JP2007/063535 mailed Aug. 14, 2007.
Derwent Abstract 1991-010971 of JP 2-283635, Nov. 21, 1990.

* cited by examiner

*Primary Examiner* — Karl Group
*Assistant Examiner* — Elizabeth A Bolden
(74) *Attorney, Agent, or Firm* — Nixon & Vanderhye P.C.

(57) ABSTRACT

A fluorophosphate glass having a fluorine content of 25% or more by anionic %, which is produced from a glass raw material containing 0.1 to 0.5%, by anionic %, of a halide containing a halogen element selected from chlorine, bromine or iodine, and a phosphate glass having a fluorine content of less than 25% by anionic %, which is produced from a glass raw material containing 0.1 to 5%, by anionic %, of a halide containing a halogen element selected from chlorine, bromine or iodine.

4 Claims, 1 Drawing Sheet

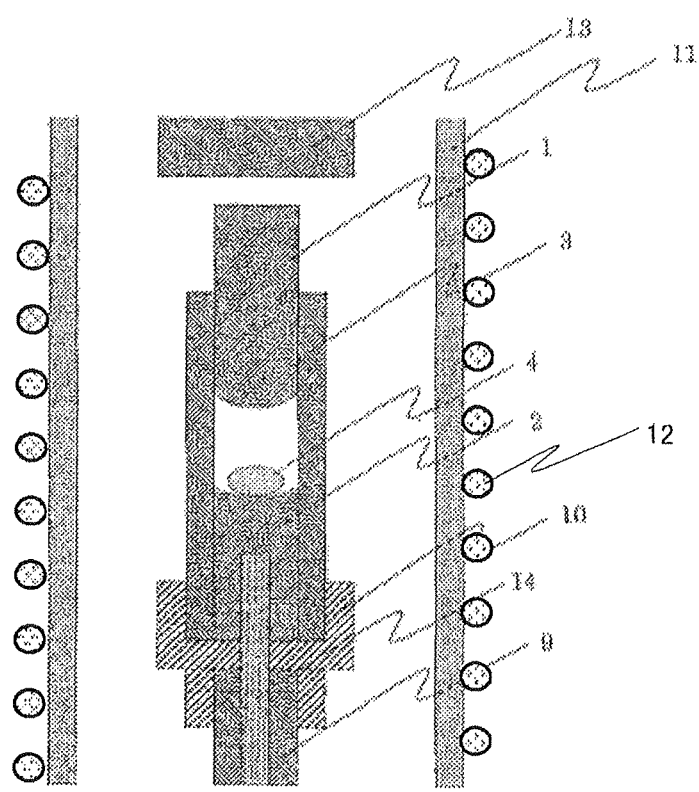

PHOSPHATE GLASS, FLUOROPHOSPHATE GLASS, PREFORM FOR PRECISION PRESS-MOLDING, OPTICAL ELEMENT AND PROCESS FOR THE PRODUCTION OF THEREOF

This application is a divisional of application Ser. No. 12/306,777 filed Feb. 6, 2009 now U.S. Pat. No. 8,183,169, now allowed, which in turn is the U.S. national phase of International Application No. PCT/JP2007/063535 filed 29 Jun. 2007 which designated the U.S. and claims priority to Japanese Patent Application No. 2006-183223 filed 3 Jul. 2006, the entire contents of each of which are hereby incorporated by reference.

TECHNICAL FIELD

The present invention relates to a phosphate glass, a fluorophosphate glass, preforms for precision press-molding (precision press-molding preforms) and optical elements formed of the above glasses, and processes for the production thereof.

BACKGROUND ART

Phosphorus-containing glasses such as a phosphate glass, a fluorophosphate glass, etc., are widely used in fields of optical glasses such as a high-refractivity high-dispersion glass and a low-dispersion glass and filter glasses for color sensitivity correction. Japanese translation version No. 3-500162 of PCT publication discloses a phosphorus-containing optical glass.

BRIEF DESCRIPTION OF THE DRAWINGS

FIG. 1 is a cross-section of a press machine in which precision press-molded preforms are prepared to provide aspherical lenses.

DISCLOSURE OF THE INVENTION

The present inventor has studied phosphorus-containing glasses to obtain the following findings.

For producing a glass that is required to have high quality such as an optical glass, it is suitable to employ a method in which a glass is refined and homogenized in a vessel made of platinum or a platinum alloy and is caused to flow out of a pipe made of platinum or a platinum alloy, in order to prevent impurities from being included in the molten glass in an ultra-high temperature state.

However, when a glass is produced by the above method, the problem is that a glass that is flown out returns from a lower end of the pipe and wets an outer circumferential surface of the pipe to decrease the quality of a glass to be shaped. The glass that has returned back and wetted the outer circumferential surface is altered since it is exposed to an external atmosphere in a high-temperature state for a long period of time, and a glass that is caused to flow out comes to contain part of the above altered glass, so that a glass as a product is degraded in quality.

It is an object of the present invention to overcome the above returning back and wetting problem of a phosphorus-containing glass so that there can be provided a high-quality phosphorus-containing glass, a precision press-molding preform formed of the above glass, an optical element and processes for the production of these.

For achieving the above object, the present inventor has made diligent studies and as a result it has been found that the above object can be achieved by a fluorophosphate glass or phosphate glass produced from a glass raw material into which a halide containing a halogen element selected from chlorine, bromine or iodine is introduced at a specific amount ratio. The present invention has been accordingly completed on the basis of this finding.

That is, the present invention provides;
(1) a fluorophosphate glass having a fluorine content of 25% or more by anionic %, which is produced from a glass raw material containing 0.1 to 0.5%, by anionic %, of a halide containing a halogen element selected from chlorine, bromine or iodine,
(2) a phosphate glass having a fluorine content of less than 25% by anionic %, which is produced from a glass raw material containing 0.1 to 5%, by anionic %, of a halide containing a halogen element selected from chlorine, bromine or iodine,
(3) a process for the production of a fluorophosphate glass having a fluorine content of 25% or more by anionic %, which comprises the steps of melting a glass raw material containing 0.1 to 0.5%, by anionic %, of a halide containing a halogen element selected from chlorine, bromine or iodine, and causing molten glass to flow out of a pipe made of platinum or a platinum alloy to carry out shaping,
(4) a process for the production of a phosphate glass having a fluorine content of less than 25% by anionic %, which comprises the steps of melting a glass raw material containing 0.1 to 5%, by anionic %, of a halide containing a halogen element selected from chlorine, bromine or iodine, and causing molten glass to flow out of a pipe made of platinum or a platinum alloy to carry out shaping,
(5) a precision press-molding preform formed of the fluorophosphate glass recited in the above (1) or a fluorophosphate glass produced by the production process recited in the above (3),
(6) a precision press-molding preform formed of the phosphate glass recited in the above (2) or a phosphate glass produced by the production process recited in the above (4),
(7) a process for the production of a precision press-molding preform formed of a fluorophosphate glass having a fluorine content of 25% or more by anionic %, which comprises melting a fluorophosphate glass raw material containing 0.1 to 0.5%, by anionic %, of a halide having a halogen element selected from chlorine, bromine or iodine, causing molten glass to flow out of a pipe made of platinum or a platinum alloy, to obtain a molten glass gob, and shaping the molten glass gob into the precision press-molding preform during cooling of the molten glass gob,
(8) a process for the production of a precision press-molding formed of a phosphate glass having a fluorine content of less than 25% by anionic %, which comprises melting a phosphate glass raw material containing 0.1 to 5%, by anionic %, of a halide containing a halogen element selected from chlorine, bromine or iodine, causing molten glass to flow out of a pipe made of platinum or a platinum alloy, to obtain a molten glass gob, and shaping the molten glass gob into the precision press-molding preform during cooling of the molten glass gob,
(9) an optical element formed of the fluorophosphate glass recited in the above (1),

(10) an optical element formed of the phosphate glass recited in the above (2),

(11) a process for the production of an optical element formed of a fluorophosphate glass, which comprises processing a fluorophosphate glass produced by the production process recited in the above (3),

(12) a process for the production of an optical element formed of a fluorophosphate glass, which comprises heating the precision press-molding preform recited in the above (5) or a precision press-molding preform produced by the production process recited in the above (7) and carrying out precision press-molding thereof.

(13) a process for the production of an optical element formed of a phosphate glass, which comprises processing a phosphate glass produced by the production process recited in the above (4), and

(14) a process for the production of an optical element formed of a phosphate glass, which comprises heating and precision press-molding the precision press-molding preform recited in the above (6) or a precision press-molding preform produced by the production process recited in the above (8).

According to the present invention, there can be provided a high-quality fluorophosphate glass, a high-quality phosphate glass, preforms formed of the above glasses and optical elements formed of the above glasses and processes for the production of them.

BRIEF DESCRIPTION OF DRAWINGS

FIG. 1 is a schematic drawing for showing an embodiment in which a precision press-molding preform is precision press-molded in the present invention.

PREFERRED EMBODIMENTS OF THE INVENTION

In the present invention, of phosphorus-containing glasses (generally containing at least 10%, by cationic %, of $P^{5+}$), a glass having a fluorine content of 25% or more by anionic % is referred to as "fluorophosphate glass", and a glass having a fluorine content of less than 25% by anionic % is referred to as "phosphate glass".

In the following explanation, a pipe made of platinum or a platinum alloy will be sometimes referred to as a platinum pipe.

Phosphorus-containing glasses such as a fluorophosphate glass and a phosphate glass have the property of returning back to wet the outer circumferential surface of a platinum pipe. The present inventor has found that when a proper amount of a halogen element selected from chlorine, bromine or iodine is introduced into a glass, there can be produced remarkable effects that the returning back and wetting can be decreased and that the amount of glass that returns back to wet the outer circumferential surface of a platinum pipe is suppressed as compared even with a glass that inherently does not much return back to wet the above outer circumferential surface.

However, when the above halogen element is added to excess, a vessel made of platinum or a platinum alloy for melting, refining and homogenizing a glass is liable to be corroded and a platinum solid substance called platinum grains may be included in the glass or dissolved in the glass in the form of platinum ion to color the glass. Therefore, when the above halogen element in a proper amount range is introduced, the returning back of a glass to wet the outer circumference can be decreased while keeping the glass from inclusion of platinum grains and coloring, and a high-quality glass can be obtained.

The present invention has been completed on the basis of the above finding.

[Fluorophosphate Glass]

In the present invention, a first embodiment is a fluorophosphate glass having a fluorine content of 25% or more by anionic %, which is produced from a glass raw material containing 0.1 to 0.5%, by anionic %, of a halide having a halogen element selected from chlorine, bromine or iodine (to be sometimes referred to as "first glass" hereinafter).

When the amount of the above halogen element based on the glass raw material is less than 0.1%, it is difficult to produce a sufficient effect on the suppression of the returning and wetting. When it exceeds 0.5%, a glass is liable to be colored due to inclusion of platinum grains or elution of platinum ion. The amount of the above halogen element is preferably in the range of 0.1 to 0.4%, more preferably 0.15 to 0.3%.

Of chlorine, bromine and iodine, chlorine is the most preferred as a halogen element in view of the above effect and an economic performance.

The above fluorophosphate glass refers to a glass that contains 25% or more of $F^-$ by anionic % and that also contains 10% or more of $P^{5+}$ by cationic %, and the glass is suitable for materializing a low-dispersion glass. The above glass contains, as an essential component, fluorine that exhibits very high volatility when the glass is in a molten state. Therefore, volatilization greatly takes place from glass that has returned back onto the outer circumferential surface of a platinum pipe, and the glass is greatly degraded in quality due to the returning and wetting. When the present invention is applied to the fluorophosphate glass, it produces a very high effect.

The above fluorophosphate glass includes, for example, a glass comprising, by cationic %, 10 to 45% of $P^{5+}$, 5 to 35% of $Al^{3+}$, 0 to 20% of $Mg^{2+}$, 0 to 25% of $Ca^{2+}$, 0 to 30% of $Sr^{2+}$, 0 to 33% of $Ba^{2+}$, 1 to 30% of $Li^+$, 0 to 10% of $Na^+$, 0 to 10% of $K^+$, 0 to 5% of $Y^{3+}$ and 0 to 15% of $B^{3+}$, wherein the molar ratio of a content of $F^-$ to a total content of $F^-$ and $O^{2-}$, $F^-/(F^-+O^{2-})$, is from 0.25 to 0.85.

The above fluorophosphate glass preferably has optical constants represented by a refractive index (nd) of 1.40 to 1.58 and an Abbe's number (vd) of 67 to 90.

The cationic % as used herein stands for a proportion of a cationic component based on its molar ratio, and the anionic % as used herein stands for a proportion of an anionic component based on its molar ratio.

Further, a content of a cation by % will stand for a content of a cation by cationic % and a content of an anion by % will stand for a content of an anion by anionic % hereinafter unless otherwise specified.

$P^{5+}$ is an essential component as a glass network former. When the content thereof is less than 10%, the glass is degraded in stability. When it exceeds 45%, the amount ratio of oxygen is increased since it is required to introduce $P^{5+}$ in the form of an oxide material, and no intended optical properties are satisfied. The content of $P^{5+}$ is generally 10 to 45%, preferably in the range of 10 to 40%.

$Al^{3+}$ is a component that improves the fluorophosphate glass in stability. When the content thereof is less than 5%, the glass is degraded in stability. When it exceeds 35%, the glass transition temperature (Tg) and the liquidus temperature (LT) are greatly increased, which leads to an increase in shaping temperature, and intense striae take place due to surface volatilization during shaping. Therefore, a homogeneous glass shaped material, in particular, a precision press-molding preform can be no longer produced. The content of $Al^{3+}$ is generally 5 to 35%, preferably in the range of 5 to 30%.

When introduced, $Mg^{2+}$, $Ca^{2+}$, $Sr^{2+}$ and $Ba^{2+}$ as divalent cationic components ($R^{2+}$) contribute to the improvement of stability. Preferably, two or more of these are introduced rather than they are introduced singly. More preferably, at least two of $Ca^{2+}$, $Sr^{2+}$ and $Ba^{2+}$ are introduced. For improving the effect produced by the introduction of the divalent cationic components ($R^{2+}$), preferably, the total content of $Mg^{2+}$, $Ca^{2+}$, $Sr^{2+}$ and $Ba^{2+}$ is adjusted to 1% or more. Further, when any one of these components is introduced in an amount that exceeds the upper limit of such a component, the stability sharply decreases. $Ca^{2+}$ and $Sr^{2+}$ may be introduced in a relatively large amount, while $Mg^{2+}$ and $Ba^{2+}$ in particular decrease the stability when introduced in a large amount each. Since, however, $Ba^{2+}$ is a component that can realize high refractivity with maintaining the property of low dispersion, it is preferred to introduce $Ba^{2+}$ in a large amount so long as the stability is impaired. Therefore, the content of $Mg^{2+}$ is generally 0 to 20%, preferably 0 to 15%, more preferably 1 to 15%, the content of $Ca^{2+}$ is generally 0 to 25%, preferably 0 to 20%, more preferably 1 to 20%, the content of $Sr^{2+}$ is generally 0 to 30%, preferably 0 to 25%, more preferably 1 to 25%, and the content of $Ba^{2+}$ is generally 0 to 33%, preferably 0 to 30%, more preferably 1 to 30%, still more preferably 4 to 30%.

$Li^+$ works to decrease the glass transition temperature (Tg) and melting temperature without impairing the stability of the glass. When the content thereof exceeds 30%, the durability is impaired and at the same time the processability is decreased. The content of $Li^+$ is therefore generally 1 to 30%. It is preferably in the range of 1 to 25%, more preferably 5 to 25%.

Each of $Na^+$ and $K^+$ effectively decreases the glass transition temperature (Tg) like $Li^+$, while they are also liable to increase the thermal expansion coefficient as compared with $Li^+$. Further, NaF and KF degrade the water resistance since they have much larger solubility in water than LiF, so that the content of each of $Na^+$ and $K^+$ is generally adjusted to 0 to 10%. The content of $Na^+$ is preferably in the range of 0 to 5%, more preferably 0 to 3%, and the content of $K^+$ is preferably in the range of 0 to 5%, more preferably 0 to 3%.

$Y^{2+}$ has an effect on the improvement of stability and durability of the glass. When the content thereof exceeds 5%, the stability is degraded on the contrary, and the glass transition temperature (Tg) is also increased to a great extent, so that the content of $Y^{3+}$ is generally 0 to 5%. It is preferably in the range of 0 to 3%.

$B^{3+}$ is liable to volatilize in the form of $BF_3$ during melting and causes striae, so that the content thereof is generally 0 to 15%, preferably 0 to 10%, more preferably 0 to 5%.

For stably producing a high-quality optical glass, the total content, by cationic %, of $P^{5+}$, $Al^{3+}$, $Mg^{2+}$, $Ca^{2+}$, $Sr^{2+}$, $Ba^{2+}$, $Li^+$ and $Y^{3+}$ is preferably over 80%, more preferably over 90%.

The above glass may contain, as cationic components, Ti, Zr, Zn, La and lanthanoid elements such as Gd, etc., in addition to the above cationic components so long as the object of the present invention is not impaired.

Concerning proportions of anionic components, the molar ratio of the content of $F^-$ to the total content of $F^-$ and $O^{2-}$, $F^-/(F^- + O^{2-})$, is generally from 0.25 to 0.80, preferably from 0.3 to 0.8, for obtaining an optical glass that materializes desired optical properties and at the same time has excellent stability.

The first glass exhibits high transmittance in a visible light region unless it contains a colorant added. When the first glass is prepared as a sample having flat surfaces in parallel with each other and having a thickness of 10 mm and when light is caused to enter the sample in the direction perpendicular to the above surfaces, the first glass generally exhibits a light transmittance (excluding a reflection loss on the sample surface), measured at a wavelength of 400 nm to 2,000 nm, of 90% or more, preferably, 95% or more.

When a colorant is added, the valence number of coloring ion changes due to ion of the above halogen element, and no desired transmittance property may be obtained in some cases.

The first glass among phosphorus-containing glasses has a relatively low glass transition temperature. The first glass can be therefore used as a glass for precision press-molding. However, when the precision press-molding temperature shifts toward a high-temperature side, the glass may cause the formation of bubbles or surface fogging, or when it shifts toward a low-temperature side, the glass may break, which leads to a decrease in productivity. Therefore, the glass transition temperature is further decreased, whereby the proper range of the precision press-molding temperature can be broadened and the precision press-molding can be improved in productivity. From the above viewpoint, the first glass preferably has a glass transition temperature (Tg) of 470° C. or lower, and it more preferably has a glass transition temperature (Tg) of 430° C. or lower. For materializing a glass having the above glass transition temperature, it is preferred to introduce $Li^+$ as a cationic component, and it is more preferred to adjust its content to 5 to 30%.

In the first glass, a glass into which $Li^+$ out of alkali metal ions is actively incorporated has a relatively small thermal expansion coefficient and exhibits relatively good water resistance. Such a glass can be therefore finished into a glass having smooth surfaces and high quality when it is processed into a precision press-molding preform by polishing or processed into an optical element.

Further, the first glass containing 5% or more of $Li^+$ has optical constants equivalent to those of a glass containing no $Li^+$ and can have a melting temperature lower by about 50° C. than that of a glass containing no $Li^+$, so that failures such as coloring of a glass caused by inclusion of platinum from a melting vessel, inclusion of bubbles and striae can be further decreased or overcome.

[Phosphate Glass]

In the present invention, a second embodiment is a phosphate glass having a fluorine content of less than 25% by anionic %, which is produced from a glass raw material containing 0.1 to 5%, by anionic %, of a halide having a halogen element selected from chlorine, bromine or iodine.

When the content of the above halogen element based on the glass raw material is less than 0.1%, it is difficult to produce a sufficient effect on the suppression of the returning and wetting. When it exceeds 5%, the glass is liable to be colored due to inclusion of platinum grains or elution of platinum ion.

The above phosphate glass includes the following second glass and third glass.

The second phosphate glass is particularly suitable as a low-dispersion glass, and it is particularly preferred as a glass that can accomplish an Abbe's number (vd) in the range of 60 to 70.

The above phosphate glass is a glass having an $F^-$ content of less than 25% by anionic % and generally containing 20% or more of $P^{5+}$ by cationic %, and for example, it includes a glass comprising, by cationic %, 20 to 50% of $PO_{2.5}$, 0 to 20% of MgO, 0 to 20% of CaO, 0 to 15% of SrO, 0 to 25% of BaO, 0 to 15% of ZnO, 0 to 25% of $LiO_{0.5}$, 0 to 10% of $NaO_{0.5}$, 0 to 15% of $KO_{0.5}$, 0 to 40% of $BO_{1.5}$, 0 to 10% of $AlO_{1.5}$, 0 to 10% of $GdO_{1.5}$ and 0 to 1% of $SbO_{1.5}$.

A glass having the above composition is suitable for materializing a glass having a refractive index (nd) of 1.55 to 1.65.

The above composition is required to be melted at a relatively high temperature since it does not have a melting-temperature-reducing effect produced by fluorine unlike the above first glass, and further, it requires no melting in a reducing atmosphere, so that the amount of a finally remaining halide in the glass tends to be small even when a relatively large amount of the halide is introduced into the glass raw material. Therefore, the content of the above halogen element in the glass raw material is adjusted to 0.1 to 5% by anionic %.

In the above composition, $PO_{2.5}$ is a component that forms the network structure of the glass, and it is an essential component that imparts the composition with stability for producing the glass. However, when the content of $PO_{2.5}$ exceeds 50%, it causes the glass transition temperature and the sag temperature to increase and it degrades the glass in refractivity and climate resistance. When it is less than 20%, the tendency of the glass toward devitrification is intensified and the glass is destabilized, so that the content of $PO_{2.5}$ is generally in the range of 20 to 50%. It is preferably in the range of 25 to 45%.

MgO works to increase the climate resistance of the glass, and when a small amount of MgO is introduced, it also decreases the transition temperature, sag temperature and liquidus temperature of the glass. However, when a large amount of MgO is introduced, the glass is greatly degraded in stability against devitrification and the liquidus temperature may be increased on the contrary. The content of MgO is therefore generally 0 to 20%. It is preferably in the range of 5 to 25%.

CaO works to improve the glass in stability and decrease the liquidus temperature. When it is introduced to excess, however, the durability of the glass is degraded and the refractive index is also decreased, so that the content of CaO is generally 0 to 20%, preferably 0 to 15%.

SrO also works to improve the glass in stability and decrease the liquidus temperature. However, when it is introduced to excess, the durability of the glass is degraded and the refractive index is also decreased, so that the content of SrO is generally 0 to 15%, preferably 0 to 10%.

BaO is a component that increases the refractivity of the glass, improves the glass in stability against devitrification and decreases the liquidus temperature. However, when it is introduced to excess, not only the glass is destabilized, but also the liquidus temperature, glass transition temperature and sag temperature are increased. Therefore, the content of BaO is generally in the range of 0 to 25%. It is preferably in the range of 0 to 20%.

ZnO works to greatly decrease the glass transition temperature and improve the glass in stability. When it is introduced to excess, however, the Abbe's number is sharply decreased and it is difficult to obtain a low-dispersion glass. Therefore, the content of ZnO is generally in the range of 0 to 15%. It is preferably in the range of 0 to 10%.

$LiO_{0.5}$ is a component that is used for decreasing the glass transition temperature and sag temperature thereby to decrease the press-shaping temperature during the press-molding (including precision press-molding) of an optical element. When a small amount of $LiO_{0.5}$ is introduced, the glass transition temperature is decreased to a great extent. However, when a large amount thereof is introduced, the glass is degraded in climate resistance and stability and the refractive index is also sharply decreased, so that the content of $LiO_{0.5}$ is generally 0 to 25%. It is preferably in the range of 5 to 20%.

Each of alkali metal oxides such as $NaO_{0.5}$, $KO_{0.5}$, etc, is a component that is introduced for improving the glass in devitrification resistance, decreasing the sag temperature and liquidus temperature and improving the glass in high-temperature meltability. The introduction of a proper amount of each of $NaO_{0.5}$ and $KO_{0.5}$ improves the glass in stability and leads to a decrease in liquidus temperature and transition temperature. When over 10% of $NaO_{0.5}$ is introduced or when over 15% of $KO_{0.5}$ is introduced, the glass is not only degraded in stability but also greatly degraded in climate resistance. Therefore, the content of $NaO_{0.5}$ is generally 0 to 10%, preferably 0 to 5%, and the content of $KO_{0.5}$ is generally 0 to 15%, preferably 0 to 10%.

$BO_{1.5}$ is a component that is very effective for improving the glass in meltability and homogenizing the glass. At the same time, $BO_{1.5}$ is also a component that is very effective for keeping the glass from forming bubbles during pressing by modifying the bonding property of OH inside the glass when a small amount thereof is introduced. However, when $BO_{1.5}$ is introduced to excess, the glass is degraded in climate resistance and also degraded in stability. Therefore, the content thereof is generally in the range of 0 to 40%. It is preferably in the range of 5 to 35%.

$AlO_{1.5}$ is used as a component effective for improving the glass in climate resistance. When it is introduced to excess, however, the glass transition temperature is increased, and the glass is degraded in stability and is also degraded in high-temperature meltability. Further, the refractive index may be decreased. Therefore, the content of $AlO_{1.5}$ is generally 0 to 10%, and it is preferably 0 to 5%.

$GdO_{1.5}$ works to improve the glass in climate resistance and refractivity to a great extent. When it is introduced to excess, however, the Abbe's number is decreased and the glass may be degraded in stability. Therefore, the content of $GdO_{1.5}$ is generally 0 to 10%. It is preferably 0 to 5%.

$SbO_{1.5}$ is effective as a refining agent for the glass. When over 1% of $SbO_{1.5}$ is introduced, the glass may be colored and it is liable to form bubbles during precision press-molding. Therefore, the content thereof is generally limited to 0 to 1%.

Components such as $SiO_2$, $YO_{1.5}$, $ZrO_2$, $TaO_{2.5}$, $BiO_{1.5}$, $TeO_2$, $NbO_{2.5}$, $WO_3$, $TiO_2$, $LaO_{1.5}$, etc., may be also introduced in an amount of 0 to 2% each so long as the properties of the above second glass are not impaired. When effects on the environment are taken into account, however, it is preferred to use none of $TeO_2$, PbO and $AsO_{1.5}$.

When the above glass is used for precision press-molding, the glass transition temperature (Tg) is preferably 550° C. or lower, more preferably 530° C. or lower.

The third phosphate glass has an $F^-$ content of less than 25% by anionic % and generally contains 15% or more of $P^{5+}$ by cationic %, and it is particularly preferred as a high-refractivity high-dispersion glass.

The above third glass is a phosphate glass suitable for materializing the property of high dispersion and is suitable for obtaining an Abbe's number (vd) of 35 or less, preferably 20 to 30. The above third glass includes a glass comprising, by cationic %, 15 to 40% of $PO_{2.5}$, 3 to 30% of $NbO_{2.5}$, 0 to 15% of $TiO_2$, 0 to 30% of $WO_3$, 0 to 15% of $BiO_{1.5}$, 0 to 25% of $BO_{1.5}$, 0 to 20% of BaO, 0 to 10% of ZnO, 0 to 10% of MgO, 0 to 10% of CaO, 0 to 10% of SrO, 0 to 20% of BaO, 5 to 30% of $LiO_{0.5}$, 0 to 30% of $NaO_{0.5}$, 0 to 15% of $KO_{0.5}$, 0 to 10% of $AlO_{1.5}$, 0 to 10% of $SiO_2$, 0 to 10% of $LaO_{1.5}$, 0 to 10% of $GdO_{1.5}$, 0 to 10% of $YbO_{1.5}$, 0 to 10% of $ZrO_2$ and 0 to 10% of $TaO_{2.5}$.

In the above glass, a relatively large amount of the above halide may be introduced into the glass raw material thereof like the above second glass, and 0.1 to 5%, by anionic %, of the above halide is introduced. Since, however, the above glass contains a component that may be reduced with ion of the above halogen element to form a color, the content of the above halide is preferably 0.1 to 3%, more preferably 0.1 to 1%.

$PO_{2.5}$ is a component for forming a glass network structure and is a component essential for imparting the glass with producible stability. When the content of $PO_{2.5}$ exceeds 40%, the glass transition temperature is increased, and the glass is liable to be degraded in climate resistance. Further, when the content of $PO_{2.5}$ is less than 15 mol %, the tendency of the glass toward devitrification is intensified and the glass is destabilized, so that the content of $PO_{2.5}$ is preferably in the range of 15 to 40%, more preferably in the range of 20 to 35 mol %.

$NbO_{2.5}$ is a component that is indispensable for imparting the glass with high-refractivity low-dispersion properties as described above. When the content thereof exceeds 30%, the glass transition temperature and sag temperature are increased, the glass is degraded in stability and also degraded in high-temperature meltability, and the glass is liable to form bubbles or be colored during precision press-molding. When the content thereof is less than 3%, the glass is degraded in durability and it is difficult to obtain a predetermined refractive index, so that the content of $NbO_{2.5}$ is preferably in the range of 3 to 30%, more preferably in the range of 3 to 25%.

$LiO_{0.5}$ is a component effective for decreasing the glass transition temperature as described above, and as compared with any other alkali, it does not much decrease the refractive index, nor does it degrade the durability. When the content thereof exceeds 30%, however, the glass is greatly degraded in stability and is also degraded in durability, so that the content of $LiO_{0.5}$ is preferably in the range of 5 to 30%. It is more preferably in the range of 5 to 25%.

$TiO_2$ has an effect on impartation with high-refractivity high-dispersion properties and improvement of stability against devitrification. When the content thereof exceeds 15%, however, the glass is sharply degraded in stability against devitrification and transmittance, the sag temperature and liquidus temperature are also sharply increased and the glass is liable to be easily colored during precision press-molding. Therefore, the content of $TiO_2$ is preferably 0 to 15%, more preferably 0 to 5%.

$WO_3$ is a component effective for imparting the glass with high-refractivity low-dispersion properties and the softening property at a low temperature. Like alkali metal oxides, $WO_3$ works to decrease the glass transition temperature and sag temperature and works to increase the refractive index. Further, it has an effect on suppression of wetting between the glass and press mold, so that it produces an effect that the glass releasing property from the mold is greatly improved in precision press-molding. However, when $WO_3$ is introduced to excess, for example, over 30% of $WO_3$ is introduced, the glass is liable to be easily colored, and the viscosity of the glass at a high temperature is decreased, so that the glass is difficult to hot-mold. Therefore, the content of $WO_3$ is preferably in the range of 0 to 30%, preferably 0 to 25%.

$BiO_{1.5}$ is a component for imparting the glass with high-refractivity low-dispersion properties, and it is also a component that stabilizes the glass by greatly broadening a glass-generating region and is also a component that improves the glass in climate resistance. When $BiO_{1.5}$ is introduced, therefore, a glass having a smaller content of $PO_{2.5}$ can be formed. However, when the content thereof exceeds 15%, the glass is liable to be devitrified on the contrary, and at the same time the glass is liable to be colored, so that the content of $BiO_{1.5}$ is preferably 0 to 15%, more preferably 0 to 10%.

$BO_{1.5}$ is a component effective for improving the glass in meltability and homogenizing the glass. At the same time, $BO_{1.5}$ produces an effect that the glass is kept from forming bubbles during precision press-molding by modifying the bonding property of OH inside the glass when a small amount thereof is introduced. However, when over 25% of $BO_{1.5}$ is introduced, the glass is degraded in climate resistance and degraded in stability. Therefore, the content thereof is generally in the range of 0 to 25%. It is preferably in the range of 0 to 20%.

BaO is a component that produces effects that the glass is imparted with high refractivity and is improved in stability against devitrification and that the liquidus temperature is decreased. When $WO_3$ is introduced, in particular when a large amount of $WO_3$ is introduced, BaO keeps the glass from being colored and highly effectively improves the glass in stability against devitrification. When the content of $PO_{2.5}$ is small, BaO also produces an effect that the glass is improved in climate resistance. However, when the content of BaO exceeds 20%, not only the glass is destabilized, but also the glass transition temperature and sag temperature are also increased. Therefore, the content of BaO is preferably 0 to 20%, more preferably 0 to 15%.

ZnO is a component that can be introduced for increasing the refractivity and dispersion of the glass, and when introduced in a small amount, it can also effectively decrease the glass transition temperature, sag temperature and liquidus temperature. When ZnO is introduced to excess, however, the stability of the glass against devitrification is degraded, and the liquidus temperature may be increased. Therefore, the content of ZnO is preferably in the range of 0 to 10%, more preferably 0 to 5%.

MgO, Cao and SrO are components that can be introduced for adjusting the stability and climate resistance of the glass. When they are introduced to excess, however, the glass is greatly destabilized. Therefore, the content of each component of these is preferably 0 to 10%, more preferably 0 to 5%.

$NaO_{0.5}$ is a component that can be introduced for improving the glass in stability against devitrification and further for decreasing the glass transition temperature and liquidus temperature and improving the meltability of the glass. However, when an excess amount of $NaO_{0.5}$ is introduced, not only the glass is degraded in stability but also the glass may be degraded in climate resistance and durability. Therefore, the content of $Na_{0.5}$ is preferably 0 to 30%, more preferably 0 to 25%.

$KO_{0.5}$ is a component that can be introduced for improving the glass in devitrification resistance and further for decreasing the glass transition temperature and liquidus temperature and improving the meltability of the glass. However, when an excess amount of $KG_{0.5}$ is introduced, not only the glass is degraded in stability but also the glass may be degraded in climate resistance and durability. Therefore, the content of $KO_{0.5}$ is preferably 0 to 15%, more preferably 0 to 10%.

$AlO_{1.5}$, $SiO_2$, $LaO_{1.5}$, $GdO_{1.5}$, $YbO_{1.5}$, $ZrO_2$ and $TaO_{2.5}$ are components that can be introduced for adjusting the stability and optical constants of the glass.

Preferably, the content of $AlO_{1.5}$ is in the range of 0 to 10%, the content of $SiO_2$ is in the range of 0 to 10%, the content of $LaO_{1.5}$ is in the range of 0 to 10%, the content of $GdO_{1.5}$ is in the range of 0 to 10%, the content of $YbO_{1.5}$ is in the range of 0 to 10%, the content of $ZrO_2$ is in the range of 0 to 10%, and the content of $TaO_{2.5}$ is in the range of 0 to 10%.

However, all of the above components increase the glass transition temperature. In the precision press-molding glass, preferably, the content of $AlO_{1.5}$ is in the range of 0 to 5%, the content of $SiO_2$ is in the range of 0 to 5%, the content of $LaO_{1.5}$ is in the range of 0 to 1.5%, the content of $GdO_{1.5}$ is in the range of 0 to 5%, the content of $YbO_{1.5}$ is in the range of 0 to 5%, the content of $ZrO_2$ is in the range of 0 to 5%, and the content of $TaO_{2.5}$ is in the range of 0 to 5%.

$SbO_{1.5}$ is effective as a refining agent for the glass. When over 1% of $SbO_{2.5}$ is introduced, however, the glass is liable to form bubbles during precision press-molding, so that the content thereof is limited to 0 to 1%.

Since $TeO_2$ is toxic, it is desirable not to use TeO2 in view of its effect on the environment. It is similarly desirable not to use PbO, $AsO_{1.5}$, CdO, $TlO_{0.5}$, radioactive substances and compounds of Cr, Hg and the like. $AgO_{0.5}$ is not required in particular and it is hence preferred to introduce no $AgO_{0.5}$.

With regard to preferred range of optical constants of the above third glass, the refractive index (nd) is 1.65 or more, more preferably 1.75 or more, still more preferably 1.8 or more. There is no limitation to be imposed on the upper limit of the refractive index (nd), while a refractive index (nd) of 2.1 is the upper limit that can be aimed at. On the other hand, the Abbe's number (vd) is more preferably 35 or less, still more preferably 30 or less. There is no limitation to be imposed on the lower limit of the Abbe's number (vd), while an Abbe's number (vd) of 15 is the lower limit that can be aimed at.

When the above third glass is used for precision press-molding, the third glass preferably has a glass transition temperature (Tg) of 600° C. or lower.

When the second glass and the third glass have larger contents of volatilizable alkali metal components, the present invention can produce more remarkable effects. Such a glass includes a precision press-molding glass and a glass having a total alkali metal oxide content of approximately 5 to 40 mol %.

For adding the above halogen element(s) to the first to third phosphorus-containing glasses, it is preferred to employ a method using a glass raw material containing a compound with a cationic component, i.e., a halide. The above method enables the introduction of a predetermined amount of a halogen element into the glass. In this case, a halide of phosphorus may highly possibly corrode platinum and has a very high vapor pressure, and it is hence not preferred for the production of a glass having stable properties.

In melting for the above first glass, preferably, each step of refining, melting and homogenizing, especially a step of melting is carried out in an inert atmosphere. It is particularly preferred to carry out the above step(s) in a hermetically closed vessel while dry inert gas is circulated therein.

The processes for the productions of the fluorophosphate glass and phosphate glass in the present invention will be explained below.

[Process for the Production of Fluorophosphate Glass]

The process for the production of a fluorophosphate glass is a process for the production of a fluorophosphate glass having a fluorine content of 25% or more by anionic %, and the process comprises the steps of melting a glass raw material containing 0.1 to 0.5%, by anionic %, of a halide having a halogen element selected from chlorine, bromine or iodine, causing a molten glass to flow out of a pipe made of platinum or a platinum alloy and carrying out shaping.

The fluorophosphate glass to be produced by this process includes the fluorophosphate glass explained with regard to the above first glass.

Raw materials such as phosphates, fluorides, carbonates, nitrates, oxides, etc., are selected as required, the selected raw materials are weighed so as to obtain an intended composition, further, and a predetermined amount of a halide selected from chloride, bromide or iodine is added. These components are mixed and then melted in a heat-resistant crucible at approximately 900 to 1,200° C. Hydroxides and hydrates promote the volatilization of fluorine and other halogen element, so that it is preferred to use none of them. When the melting is carried out, it is desirable to use a heat-resistant cover. After a glass in a molten state is stirred and refined, molten glass is caused to flow out of a pipe made of platinum or a platinum alloy to carry out glass shaping. A shaped glass is transferred into an annealing furnace that has been heated to a temperature around a glass transition temperature in advance, and the glass is cooled to room temperature to produce a glass shaped material.

[Process for the Production of Phosphate Glass]

The process for the production of a phosphate glass is a process for the production of a phosphate glass having a fluorine content of less than 25% by anionic %, and the process comprises the steps of melting a glass raw material containing 0.1 to 5%, by anionic %, of a halide having a halogen element selected from chlorine, bromine or iodine, causing a molten glass to flow out of a pipe made of platinum or a platinum alloy and carrying out shaping.

The fluorophosphate glass to be produced by this process includes the phosphate glass explained with regard to the above second glass and the phosphate glass explained with regard to the above third glass.

Raw materials such as phosphates, carbonates, nitrates, oxides and optionally fluorides are selected as required, the selected raw materials are weighed so as to obtain an intended composition, further, and a predetermined amount of a halide selected from chloride, bromide or iodine is added. These components are mixed to prepare a glass raw material. Thereafter, a glass is shaped in the same manner as in the above process for the production of a fluorophosphate glass, to produce a glass shaped material.

A glass shaped material obtained by the production process of the present invention is subjected to cutting, grinding and polishing as required. A glass shaped material may be cut and an obtained piece may be pressed under heat as required, or a precision press-molding preform may be produced, heated and precision press-molded in an aspherical form as required. In this manner, an intended optical element can be produced.

[Precision Press-Molding Preform and Process for the Production Thereof]

The precision press-molding preform of the present invention includes two embodiments.

A precision press-molding preform I as a first embodiment is formed of the above fluorophosphate glass of the present invention or a fluorophosphate glass obtained by the above production process of the present invention, and a precision press-molding preform II as a second embodiment is formed of the above phosphate glass of the present invention or a phosphate glass obtained by the above production process of the present invention.

According to the present invention, further, the above precision press-molding preform I can be produced by melting a fluorophosphate glass raw material containing 0.1 to 0.5%, by anionic %, of a halide having a halogen element selected from chlorine, bromine or iodine, causing a molten glass out of a pipe made of platinum or a platinum alloy to obtain a molten glass gob and shaping the glass gob into a precision press-molding preform during the cooling of the molten glass gob.

According to the present invention, further, the above precision press-molding preform II can be produced by melting a phosphate glass raw material containing 0.1 to 5%, by anionic %, of a halide having a halogen element selected from chlorine, bromine or iodine, causing a molten glass out of a pipe made of platinum or a platinum alloy to obtain a molten glass gob and shaping the glass gob into a precision press-molding preform during the cooling of the molten glass gob.

The precision press-molding preform (to be sometimes simply referred to as "preform" hereinafter) is a glass shaped material that has a weight equivalent to the weight of a precision press-molded product and that is pre-shaped in a form suitable for precision press-molding. The form of the preform includes, for example, the form of a sphere and the form of a body of revolution having one axis of symmetry. The above body of revolution includes a body of which any cross-section including the above axis of symmetry has a smooth contour line free of a corner and a dent, such as a body of which the above cross-section of an ellipse having a contour line whose minor axis corresponds to the axis of symmetry. Further, the following form of preform is preferred. When one of angles formed by a line connecting any point on the contour line on the above cross section of a preform to the center of gravity of the preform on the axis of symmetry and a tangent line contacting the contour line on the above point on the contour line is taken as θ, and when the above point starts at the axis of revolution symmetry and moves along the contour line, the angle θ monotonously increases from 90°, then decreases monotonously and then increases monotonously to come to be 90° at the other point where the contour line crosses the axis of symmetry. The preform is heated so as to have a press-moldable viscosity and then press-molded.

The above preform may have a thin film such as a mold release film on its surface as required. Examples of the mold release film include a carbon-containing film, a self-assembled film, and the like. The above preform is press-moldable to give an optical element having predetermined optical constants.

The specific process for the production of a preform will be explained below. In the process for the production of a precision press-molding preform, provided by the present invention, a glass gob obtained by separating it from a molten glass that flows out of a pipe made of platinum or a platinum alloy is shaped during the cooling of said glass, to produce a precision press-molding preform.

The above process has an advantage that it does not require machine processes such as cutting, grinding, polishing, and the like. In a preform to which the machine process is applied, it is required to anneal a glass before the machine process in order to decrease a strain of the glass to such an extent that the glass is not broken. However, the above process for the production of a preform requires no annealing for preventing the breaking. Further, a preform having a smooth surface can be shaped. Further, since the entire surface of the preform is a surface formed by solidification of a glass in a molten state, the surface neither has any fine scratch caused by polishing nor has any latent damage. In addition to the chemical durability and climate resistance of the glass per se, the preform has a smooth surface, so that the preform has a small surface area as compared with a preform having a scratched surface. When the preform is placed in atmosphere, therefore, the surface of the preform does not easily undergo alteration, so that the preform can maintain a clean surface state obtained immediately after it is shaped, for a long period of time.

In the above process for the production of a preform, further, it is preferred to shape the preform in a floating state produced by application of gas pressure, from the viewpoint that the preform is imparted with a smooth and clean surface. When the glass gob is separated in the above production process, if it is separated by cutting the molten glass with a cutting blade, a cutting mark called a shear mark takes place. When the shear mark of the preform remains in a precision press-molded product, the shear mark portion constitutes a defect, so that separation free from the shear mark is desirable. The method of separating a molten glass without using any cutting blade so as not to form any shear mark includes a method in which a molten glass is caused to drop from a flow pipe and a method in which the forward end of a molten glass flow flowing out of a flow pipe is supported and the support is removed at a time when a molten glass gob having a predetermined weight can be separated (to be referred to as "descent cutting method" hereinafter). In the descent cutting method, a glass is separated at a narrow portion generated between the forward end side and the flow pipe side of the molten glass flow, whereby a molten glass gob having a predetermined weight can be obtained. Then, the thus-obtained molten glass gob is shaped into a form suitable for press molding while it is in a softened state, whereby a preform can be obtained.

[Optical Element and Process for the Production Thereof]

The optical element of the present invention has two embodiments. An optical element I as a first embodiment is formed of the above fluorophosphate glass of the present invention, and an optical element II as a second embodiment is formed of the above phosphate glass of the present invention.

According to the present invention, the above optical element I can be produced by processing a fluorophosphate glass produced by the above process of the present invention or by heating the precision press-molding preform I of the present invention or a precision press-molding preform I produced by the above process of the present invention and precision press-molding it.

According to the present invention, further, the above optical element II can be produced by processing a phosphate glass produced by the above process of the present invention or by heating the precision press-molding preform II of the present invention or a precision press-molding preform II produced by the above process of the present invention and precision press-molding it.

Examples of the optical element of the present invention include various lenses such as a spherical lens, an aspherical lens, a microlens, etc., a diffraction grating, a lens with a diffraction grating, a lens array, a prism, and the like.

The above optical element may be provided with an optical thin film such as an anti-reflection film, a total reflection film, a partial reflection film, a film having spectral characteristics, or the like.

The process for the production of an optical element from a precision press-molding will be explained below.

The precision press-molding process is also called a mold optics method and is well known in the field of art to which the present invention pertains.

That surface of an optical element which transmits, refracts, diffracts or reflects light is called an optical-function surface. For example, when the optical element is a lens, a lens surface such as the aspherical surface of an aspherical lens or a spherical surface of a spherical lens corresponds to the optical-function surface. The precision press-molding method is a method in which the form of molding surface of a press mold is precisely transferred to a glass to form the optical-function surface by press molding. That is, it is not required to apply machine processes such as grinding, polishing, etc., for finishing the optical-function surface.

The above process is therefore suitable for producing optical elements such as a lens, a lens array, a diffraction grating, a prism, and the like, and is particularly optimum for producing aspherical lenses highly productively.

The press mold for use in the precision press-molding method can be selected from known molds such as a mold obtained by providing a mold release film to the molding surface of a mold material made of a silicon carbide, an ultra-hard material, stainless steel, or the like, while a press mold made of silicon carbide is preferred. The mold release film can be selected from a carbon-containing film, a noble metal alloy film, or the like, while a carbon-containing film is preferred in view of durability, a cost, and the like.

In the precision press-molding method, it is desirable to employ a non-oxidizing gas for an atmosphere during molding, in order to maintain the molding surface of the press mold under good conditions. The non-oxidizing gas is preferably selected from nitrogen or a gas mixture of nitrogen with hydrogen.

The precision press-molding method particularly suitable for the process for the production of an optical element from a preform will be explained below.

[Precision Press-Molding Method 1]

This method comprises introducing the above preform into a press mold, heating the above press mold and the above preform together and precision press-molding the preform (to be referred to as "precision press-molding method 1" hereinafter).

In the precision press-molding method 1, preferably, the press mold and the above preform are heated together to a temperature at which the glass constituting the preform exhibits a viscosity of $10^6$ to $10^{12}$ dPa·s for carrying out the precision press-molding.

Further, desirably, the press mold and a precision press-molded product are cooled to a temperature at which the above glass exhibits a viscosity of $10^{12}$ dPa·s or higher, more preferably $10^{14}$ dPa·s or higher, still more preferably $10^{16}$ dPa·s or higher, to take the precision press-molded product out of the press mold.

Under the above conditions, not only the form of the molding surface of the press mold can be more precisely transferred to the glass, but also the precision press-molded product can be taken out without causing any deformation.

[Precision Press-Molding Method 2]

This method comprises introducing a pre-heated preform into a press mold and precision press-molding the preform (to be referred to as "precision press-molding method 2" hereinafter).

According to this method, the above preform is heated prior to the introduction of the preform into the press mold, so that the cycle time can be decreased, and at the same time there can be produced an optical element being free of a surface defect and having an excellent surface accuracy.

Preferably, the temperature for pre-heating the press mold is set at a temperature lower than the temperature for pre-heating the preform. Since the temperature for pre-heating the press mold is set at a lower temperature in this manner, the abrasion of the above mold can be decreased.

In the precision press-molding method 2, desirably, the above preform is pre-heated to a temperature at which the glass constituting the above preform exhibits a viscosity of $10^9$ dPa·s or less, more preferably $10^{5.5}$ to $10^8$ dPa·s. Further, it is preferred to pre-heat the above preform while it is caused to float.

Preferably, the cooling of the glass is initiated simultaneously with the initiation of the pressing or during the pressing.

The temperature of the press mold is adjusted to a temperature lower than the above temperature for preheating the preform, and a temperature that should be aimed at can be a temperature at which the above glass exhibits a viscosity of $10^9$ to $10^{12}$ dPa·s.

In this method, preferably, the precision press-molded product is taken out of the mold after cooled to a temperature at which the above glass exhibits a viscosity of $10^{12}$ dPa·s or more.

An optical element obtained by the precision press-molding is taken out of the press mold, and it is gradually cooled as required. When the molded product is an optical element such as a lens, or the like, the optical element may be surface-coated with an optical thin film as required.

Phosphorus-containing glasses such as a fluorophosphate glass and a phosphate glass have the property of easily returning back and wetting the outer circumferential surface of a platinum pipe. However, the property of returning back and wetting the above outer circumference can be decreased by introducing a halogen element selected from chlorine, bromine or iodine into the glass like the present invention, and the inclusion of platinum grains and the coloring can be prevented, so that there can be provided a high-quality fluorophosphate glass and phosphate glass and that there can be provided high-quality optical elements formed of these glasses.

EXAMPLES

The present invention will be explained more in detail with reference to Examples, while the present invention shall not be limited by these Examples.

Phosphates, fluorides, etc., corresponding to a glass component, were used as raw materials for a glass, and the raw materials were weighed so as to obtain a glass having a composition shown in Table 1-1, 1-2, 1-3, 2-1, 2-2, 3-1, 3-2, 3-3 or 3-4. In these Tables, amounts of cationic components, O anionic component and F anionic component represent amounts of such contents in each glass produced, and amounts of Cl anionic component represent amount ratios of Cl in glass raw materials. The above raw materials were fully mixed and the mixture was charged into a platinum crucible and melted in an electric furnace under heat at a temperature in the range of 850 to 950° C. with stirring in an atmosphere for 1 to 3 hours. A homogenized and refined glass melt was cast into a mold made of carbon. Immediately after allowed to gradually cool to a glass transition temperature, the cast glass was placed in an annealing furnace and annealed around the glass transition temperature for 1 hour, and in the annealing furnace, it was gradually cooled to room temperature to give an optical glass.

When each of the thus-obtained glasses was observed by enlarging them through a microscope, no precipitation of a crystal was found, nor was a non-melt remainder of any raw material found. Further, the amounts of the Cl components in the thus-obtained glasses are approximately equivalent to the amounts of charged Cl shown in Tables 1-1, 1-2, 1-3, 2-1, 2-2, 3-1, 3-2, 3-3 and 3-4.

Each optical glasses obtained was measured for a refractive index (nd), an Abbe's number (vd) and a glass transition temperature (Tg) in the following manner, and in Tables 1-1, 1-2, 1-3, 2-1, 2-2, 3-1, 3-2, 3-3 and 3-4 show the results.

(1) Refractive Index (nd) and Abbe's Number (vd)

Optical glasses obtained by setting the gradually cooling temperature at −30° C./hour were measured.

(2) Glass Transition Temperature (Tg)

Measured with an apparatus for thermomechanical analysis (Thermoplas TMA 8310) supplied by Rigaku Corporation at a temperature elevation rate of 4° C./minute.

TABLE 1-1

|  |  |  | 1 | 2 | 3 | 4 | 5 | 6 | 7 | 8 |
|---|---|---|---|---|---|---|---|---|---|---|
| Glass composition | Cationic % | P | 26 | 27 | 27 | 27 | 27 | 27 | 27 | 33 |
|  |  | Al | 20 | 21 | 21 | 21 | 21 | 21 | 21 | 21 |
|  |  | Mg | 10 | 4 | 8 | 8 | 12 | 7.3 | 4.9 | 6.3 |
|  |  | Ca | 17 | 14 | 18 | 19.5 | 14 | 9.1 | 6.2 | 7.9 |
|  |  | Sr | 17 | 17 | 17 | 17 | 17 | 15.6 | 10.5 | 13.4 |
|  |  | Ba | 5 | 12 | 6 | 4.5 | 6 | 11 | 7.4 | 9.4 |
|  |  | Li | 4 | 4 | 2 | 2 | 2 | 8 | 22 | 8 |
|  |  | Na |  |  |  |  |  |  |  |  |
|  |  | Y | 1 | 1 | 1 | 1 | 1 | 1 | 1 | 1 |
|  |  | TOTAL | 100 | 100 | 100 | 100 | 100 | 100 | 100 | 100 |
|  | Anionic % | O | 35.9 | 37.2 | 36.8 | 36.8 | 36.8 | 37.9 | 40.5 | 46.2 |
|  |  | F | 63.9 | 62.6 | 63.0 | 63.0 | 63.0 | 61.9 | 59.3 | 53.6 |
|  |  | Cl* | 0.2 | 0.2 | 0.2 | 0.2 | 0.2 | 0.2 | 0.2 | 0.2 |
| Glass properties | Glass transition temperature Tg (° C.) |  | 428 | 430 | 446 | 445 | 449 | 417 | 359 | 420 |
|  | Refractive index (nd) |  | 1.490 | 1.503 | 1.495 | 1.494 | 1.493 | 1.500 | 1.488 | 1.511 |
|  | Abbe's number (νd) |  | 82 | 81 | 82 | 81 | 82 | 81 | 81 | 79 |

*Amounts of Cl anionic component represent amount ratios of Cl in glass raw materials, while it is considered that Cl anionic contents in the obtained optical glasses are nearly the same as those values.

TABLE 1-2

|  |  |  | 9 | 10 | 11 | 12 | 13 | 14 | 15 | 16 |
|---|---|---|---|---|---|---|---|---|---|---|
| Glass composition | Cationic % | P | 29 | 27 | 27 | 26 | 13 | 17 | 38 | 38 |
|  |  | Al | 19.1 | 15 | 11 | 21 | 21 | 27 | 17 | 9 |
|  |  | Mg | 6.6 | 8.3 | 9.02 | 7.5 | 9.7 | 8 |  | 6 |
|  |  | Ca | 8.3 | 10.5 | 11.28 | 9.3 | 12.1 | 10 | 4 | 4 |
|  |  | Sr | 14.1 | 17.7 | 19.2 | 15.9 | 20.7 | 17 | 5 | 5 |
|  |  | Ba | 9.9 | 12.5 | 13.5 | 11.3 | 14.5 | 12 | 22 | 16 |
|  |  | Li | 12 | 8 | 8 | 8 | 8 | 8 | 13 | 21 |
|  |  | Na |  |  |  |  |  |  |  |  |
|  |  | Y | 1 | 1 | 1 | 1 | 1 | 1 | 1 | 1 |
|  |  | TOTAL | 100 | 100 | 100 | 100 | 100 | 100 | 100 | 100 |
|  | Anionic % | O | 41.8 | 38.9 | 39.7 | 36.5 | 18.2 | 23.2 | 61.1 | 66.5 |
|  |  | F | 58.0 | 60.9 | 60.1 | 63.3 | 81.6 | 76.6 | 38.6 | 33.2 |
|  |  | Cl* | 0.2 | 0.2 | 0.2 | 0.2 | 0.2 | 0.2 | 0.3 | 0.3 |
| Glass properties | Glass transition temperature Tg (° C.) |  | 396 | 393 | 383 | 406 | 383 | 400 | 427 | 374.4 |
|  | Refractive index (nd) |  | 1.505 | 1.505 | 1.507 | 1.495 | 1.464 | 1.468 | 1.553 | 1.550 |
|  | Abbe's number (νd) |  | 79 | 80 | 79 | 82 | 88 | 88 | 73 | 72 |

*Amounts of Cl anionic component represent amount ratios of Cl in glass raw materials, while it is considered that Cl anionic contents in the obtained optical glasses are nearly the same as those values.

TABLE 1-3

|  |  |  | 17 | 18 | 19 | 20 | 21 | 22 | 23 | 24 | 25 |
|---|---|---|---|---|---|---|---|---|---|---|---|
| Glass composition | Cationic % | P | 34 | 38 | 38 | 29 | 29 | 31 | 38 | 35 | 35 |
|  |  | Al | 9 | 9 | 9 | 9 | 9 | 9 | 9 | 12 | 9 |
|  |  | Mg | 6 | 4 | 6 | 6 | 6 | 10 | 6 | 6 | 9 |
|  |  | Ca | 8 | 6 | 4 | 2 | 4 | 4 | 4 | 4 | 4 |
|  |  | Sr | 13 | 5 | 5 | 5 | 5 | 5 | 5 | 5 | 5 |
|  |  | Ba | 16 | 16 | 16 | 27 | 23 | 19 | 16 | 16 | 16 |
|  |  | Li | 13 | 21 | 21 | 21 | 21 | 21 | 18 | 21 | 21 |
|  |  | Na |  |  |  |  |  |  |  |  |  |
|  |  | Y | 1 | 1 | 1 | 1 | 3 | 1 | 1 | 1 | 1 |
|  |  | TOTAL | 100 | 100 | 100 | 100 | 100 | 100 | 100 | 100 | 100 |
|  | Anionic % | O | 62.5 | 66.5 | 72.6 | 57.7 | 57.1 | 58.4 | 66.5 | 61.0 | 62.0 |
|  |  | F | 37.2 | 33.2 | 27.1 | 42.0 | 42.6 | 41.3 | 33.2 | 38.7 | 37.7 |
|  |  | Cl* | 0.3 | 0.3 | 0.3 | 0.3 | 0.3 | 0.5 | 0.5 | 0.5 | 0.5 |

TABLE 1-3-continued

|  |  | 17 | 18 | 19 | 20 | 21 | 22 | 23 | 24 | 25 |
|---|---|---|---|---|---|---|---|---|---|---|
| Glass properties | Glass transition temperature Tg (° C.) | 420 | 371.9 | 392.4 | 366.6 | 366.5 | 363.6 | 357.1 | 365.8 | 354.9 |
|  | Refractive index (nd) | 1.550 | 1.552 | 1.558 | 1.547 | 1.546 | 1.536 | 1.542 | 1.535 | 1.538 |
|  | Abbe's number (vd) | 72 | 71 | 71 | 72 | 73 | 73 | 72 | 73 | 72 |

*Amounts of Cl anionic component represent amount ratios of Cl in glass raw materials, while it is considered that Cl anionic contents in the obtained optical glasses are nearly the same as those values.

TABLE 2-1

|  |  |  | 26 | 27 | 28 | 29 | 30 | 31 | 32 | 33 |
|---|---|---|---|---|---|---|---|---|---|---|
| Glass composition | Cationic % | $PO_{2.5}$ | 39.3 | 40.0 | 39.0 | 34.5 | 34.5 | 36.4 | 33.3 | 29.9 |
|  |  | $BO_{1.5}$ | 9.8 | 10.0 | 18.0 | 10.3 | 10.3 | 8.6 | 24.2 | 26.9 |
|  |  | $AlO_{1.5}$ | 3.3 | 3.3 | 4.8 | 3.4 | 3.4 | 4.6 | 3.0 | 3.0 |
|  |  | $LiO_{0.5}$ | 16.4 | 13.3 | 12.0 | 10.3 | 13.8 | 16.6 | 12.1 | 11.9 |
|  |  | $NaO_{0.5}$ |  |  |  | 3.0 |  |  |  |  |
|  |  | $KO_{0.5}$ |  |  |  | 3.0 |  |  | 3.0 | 9.0 |
|  |  | MgO | 5.7 | 6.7 | 10.5 | 6.9 | 8.6 | 8.3 | 10.6 | 7.5 |
|  |  | CaO | 5.7 | 6.7 | 6.6 | 6.9 | 8.6 | 8.3 | 7.6 | 7.5 |
|  |  | SrO |  |  | 1.5 |  |  |  | 1.5 | 3.0 |
|  |  | BaO | 16.4 | 16.7 | 1.5 | 17.2 | 17.2 | 15.9 | 1.5 | 1.5 |
|  |  | ZnO | 3.3 | 3.3 |  | 6.9 | 3.4 |  |  |  |
|  |  | $GdO_{1.5}$ |  |  |  |  | 3.4 | 1.3 |  |  |
|  | Anionic % | Cl* | 1.0 | 1.0 | 1.0 | 0.5 | 0.5 | 0.5 | 0.3 | 0.3 |
| Glass properties |  | Glass transition temperature Tg (° C.) | 485 | 500 | 485 | 528 | 514 | 510 | 484 | 475 |
|  |  | Sag temperature Ts (° C.) | 528 | 541 | 526 | 574 | 559 | 558 | 528 | 518 |
|  |  | Liquidus temperature LT (° C.) | 900 | 900 | 950 | 950 | 900 | 880 | 900 | 920 |
|  |  | Refractive index (nd) | 1.612 | 1.613 | 1.564 | 1.642 | 1.624 | 1.620 | 1.566 | 1.560 |
|  |  | Abbe's number (vd) | 65 | 64 | 68 | 60 | 63 | 64 | 68 | 67 |

*Amounts of Cl anionic component represent amount ratios of Cl in glass raw materials, while it is considered that Cl anionic contents in the obtained optical glasses are nearly the same as those values.

TABLE 2-2

|  |  |  | 34 | 35 | 36 | 37 | 38 | 39 | 40 | 41 |
|---|---|---|---|---|---|---|---|---|---|---|
| Glass composition | Cationic % | $PO_{2.5}$ | 38.1 | 32.8 | 31.3 | 39.3 | 39.2 | 38.1 | 33.3 | 40.0 |
|  |  | $BO_{1.5}$ | 19.0 | 29.9 | 29.9 | 8.5 | 8.5 | 15.9 | 24.2 | 18.5 |
|  |  | $AlO_{1.5}$ | 3.2 | 3.0 | 4.5 | 4.6 | 4.6 | 3.2 | 3.0 | 3.1 |
|  |  | $LiO_{0.5}$ | 12.7 | 11.9 | 11.9 | 16.4 | 17.0 | 15.9 | 18.2 | 12.3 |
|  |  | $NaO_{0.5}$ |  |  |  |  |  |  |  |  |
|  |  | $KO_{0.5}$ |  | 3.0 | 3.0 |  |  |  |  | 3.1 |
|  |  | MgO | 7.9 | 7.5 | 9.0 | 6.9 | 9.5 | 8.9 | 12.1 | 10.8 |
|  |  | CaO | 7.9 | 7.5 | 9.0 | 6.9 | 9.5 | 7.9 | 4.5 | 7.7 |
|  |  | SrO | 4.8 | 3.0 | 1.5 |  |  | 3.8 | 3.0 | 1.5 |
|  |  | BaO | 6.3 | 1.5 |  | 15.7 | 10.5 | 6.3 | 1.5 | 3.1 |
|  |  | ZnO |  |  |  | 1.6 | 1.3 |  |  |  |
|  |  | $GdO_{1.5}$ |  |  |  |  |  |  |  |  |
|  | Anionic % | Cl* | 0.3 | 0.3 | 0.3 | 0.2 | 0.2 | 0.2 | 0.2 | 0.2 |
| Glass properties |  | Glass transition temperature Tg (° C.) | 519 | 497 | 496 | 495 | 490 | 501 | 495 | 502 |
|  |  | Sag temperature Ts (° C.) | 562 | 540 | 540 | 535 | 533 | 541 | 538 | 544 |
|  |  | Liquidus temperature LT (° C.) | 950 | 950 | 950 | 880 | 870 | 930 | 930 | 930 |
|  |  | Refractive index (nd) | 1.592 | 1.567 | 1.560 | 1.610 | 1.602 | 1.593 | 1.574 | 1.570 |

TABLE 2-2-continued

|  |  | 34 | 35 | 36 | 37 | 38 | 39 | 40 | 41 |
|---|---|---|---|---|---|---|---|---|---|
|  | Abbe's number (vd) | 67 | 68 | 68 | 65 | 66 | 67 | 68 | 68 |

*Amounts of Cl anionic component represent amount ratios of Cl in glass raw materials, while it is considered that Cl anionic contents in the obtained optical glasses are nearly the same as those values.

TABLE 3-1

|  |  |  | 42 | 43 | 44 | 45 | 46 | 47 | 48 | 49 |
|---|---|---|---|---|---|---|---|---|---|---|
| Glass composition | Cationic % | $PO_{2.5}$ | 28.48 | 28.20 | 28.92 | 27.75 | 26.37 | 23.78 | 21.86 | 23.53 |
|  |  | $BO_{1.5}$ | 3.56 | 3.51 | 3.61 | 3.47 | 4.40 | 3.24 | 3.28 | 5.88 |
|  |  | $SiO_2$ |  |  |  |  |  |  |  |  |
|  |  | $LiO_{0.5}$ | 14.22 | 10.51 | 14.46 | 18.50 | 19.78 | 17.30 | 16.39 | 14.12 |
|  |  | $NaO_{0.5}$ | 11.11 | 15.14 | 8.43 | 11.56 | 15.38 | 19.46 | 21.86 | 11.76 |
|  |  | $KO_{0.5}$ | 2.37 | 2.34 | 2.41 | 2.31 | 2.20 | 8.65 | 7.65 | 3.53 |
|  |  | BaO | 5.92 | 4.67 | 6.63 | 2.89 |  |  | 1.09 | 8.82 |
|  |  | ZnO | 2.96 | 4.09 | 3.92 | 2.89 |  |  |  |  |
|  |  | SrO |  |  |  |  |  |  |  |  |
|  |  | $AlO_{1.5}$ |  |  |  |  |  |  |  |  |
|  |  | $YO_{1.5}$ |  |  |  |  |  |  |  |  |
|  |  | $BiO_{1.5}$ |  |  |  |  |  |  |  |  |
|  |  | $TiO_2$ | 2.96 | 2.92 | 2.71 | 2.89 | 4.40 | 2.70 | 2.73 | 2.94 |
|  |  | $NbO_{2.5}$ | 21.32 | 22.19 | 21.69 | 20.81 | 21.98 | 19.46 | 19.67 | 5.88 |
|  |  | $WO_3$ | 7.11 | 6.42 | 7.23 | 6.94 | 5.49 | 5.41 | 5.46 | 5.88 |
|  | Anionic % | Cl* | 0.50 | 0.50 | 0.50 | 0.50 | 0.50 | 0.50 | 0.50 | 0.50 |
| Glass properties |  | Glass transition temperature Tg (° C.) | 503 | 505 | 507 | 486 | 493 | 446 | 441 | 508 |
|  |  | Sag temperature Ts (° C.) | 556 | 559 | 554 | 538 | 546 | 495 | 496 | 561 |
|  |  | Refractive index (nd) | 1.845 | 1.845 | 1.851 | 1.842 | 1.849 | 1.809 | 1.817 | 1.860 |
|  |  | Abbe's number (vd) | 24 | 23 | 24 | 23 | 22 | 24 | 24 | 24 |

*Amounts of Cl anionic component represent amount ratios of Cl in glass raw materials, while it is considered that Cl anionic contents in the obtained optical glasses are nearly the same as those values.

TABLE 3-2

|  |  |  | 50 | 51 | 52 | 53 | 54 | 55 | 56 | 57 |
|---|---|---|---|---|---|---|---|---|---|---|
| Glass composition | Cationic % | $PO_{2.5}$ | 24.24 | 25.00 | 21.38 | 21.12 | 22.50 | 23.88 | 28.57 | 22.86 |
|  |  | $BO_{1.5}$ | 6.06 | 6.25 | 6.29 | 6.21 | 6.25 | 5.97 | 3.57 | 9.14 |
|  |  | $SiO_2$ |  |  |  |  |  |  |  |  |
|  |  | $LiO_{0.5}$ | 14.55 | 15.00 | 15.09 | 14.91 | 15.00 | 15.52 | 14.29 | 11.43 |
|  |  | $NaO_{0.5}$ | 12.12 | 12.50 | 12.58 | 12.42 | 12.50 | 10.75 | 10.71 | 11.43 |
|  |  | $KO_{0.5}$ | 3.64 | 3.75 | 3.77 | 3.73 | 3.75 | 3.58 | 2.38 | 5.71 |
|  |  | BaO | 9.09 | 9.38 | 11.32 | 9.94 | 6.25 | 3.58 | 5.95 | 11.43 |
|  |  | ZnO |  |  |  |  | 4.38 | 4.18 | 2.98 |  |
|  |  | SrO |  |  |  |  |  | 1.19 |  |  |
|  |  | $AlO_{1.5}$ |  |  |  | 2.48 |  |  |  |  |
|  |  | $YO_{1.5}$ |  |  |  |  |  |  |  | 2.29 |
|  |  | $BiO_{1.5}$ |  |  |  |  |  |  |  |  |
|  |  | $TiO_2$ | 3.03 | 3.13 | 3.14 | 3.11 | 3.13 |  | 2.98 |  |
|  |  | $NbO_{2.5}$ | 18.18 | 12.50 | 15.09 | 14.91 | 15.00 | 20.90 | 21.43 | 22.86 |
|  |  | $WO_3$ | 9.09 | 12.50 | 11.32 | 11.18 | 11.25 | 10.45 | 7.14 | 2.86 |
|  | Anionic % | Cl* | 0.30 | 0.30 | 0.30 | 0.30 | 0.30 | 0.30 | 0.20 | 0.20 |
| Glass properties |  | Glass transition temperature Tg (° C.) | 492 | 475 | 466 | 463 | 455 | 467 | 495 | 507 |
|  |  | Sag temperature Ts (° C.) | 541 | 528 | 519 | 512 | 502 | 512 | 549 | 558 |
|  |  | Refractive index (nd) | 1.833 | 1.806 | 1.826 | 1.825 | 1.830 | 1.847 | 1.852 | 1.829 |
|  |  | Abbe's number (vd) | 25 | 26 | 26 | 26 | 25 | 24 | 23 | 27 |

*Amounts of Cl anionic component represent amount ratios of Cl in glass raw materials, while it is considered that Cl anionic contents in the obtained optical glasses are nearly the same as those values.

TABLE 3-3

| | | | 58 | 59 | 60 | 61 | 62 | 63 | 64 | 65 | 66 |
|---|---|---|---|---|---|---|---|---|---|---|---|
| Glass composition | Cationic % | $PO_{2.5}$ | 20.98 | 21.00 | 21.00 | 21.00 | 20.99 | 26.67 | 26.34 | 26.37 | 24.86 |
| | | $BO_{1.5}$ | 15.00 | 9.00 | 9.00 | 9.00 | 9.00 | 3.33 | 4.61 | 4.40 | 4.32 |
| | | $SiO_2$ | | | | | | | | | |
| | | $LiO_{0.5}$ | 15.00 | 18.00 | 15.00 | 18.00 | 11.50 | 24.44 | 23.05 | 21.98 | 19.46 |
| | | $NaO_{0.5}$ | 8.50 | 11.50 | 8.50 | 11.51 | 18.00 | 12.22 | 14.27 | 12.09 | 14.05 |
| | | $KO_{0.5}$ | 3.00 | 3.00 | 3.00 | 3.00 | 3.01 | 2.22 | 2.20 | 2.20 | 2.16 |
| | | BaO | 9.60 | 9.60 | 9.60 | 9.60 | 9.60 | 1.67 | 1.65 | 1.65 | |
| | | ZnO | | | | | | 1.67 | 1.65 | 1.10 | 1.08 |
| | | SrO | | | | | | | | | |
| | | $AlO_{1.5}$ | | | | | | | | | |
| | | $YO_{1.5}$ | | | | | | | | | |
| | | $BiO_{1.5}$ | | | | | | | | 2.20 | 6.49 |
| | | $TiO_2$ | | | | | | 3.33 | 3.29 | 2.75 | 2.70 |
| | | $NbO_{2.5}$ | 18.91 | 9.90 | 18.90 | 6.90 | 3.90 | 20.00 | 19.76 | 20.88 | 20.54 |
| | | $WO_3$ | 9.0 | 18.00 | 15.00 | 21.00 | 24.00 | 4.44 | 3.18 | 4.40 | 4.32 |
| | Anionic % | Cl* | 0.20 | 0.20 | 0.20 | 0.20 | 0.20 | 0.20 | 0.20 | 0.20 | 0.20 |
| Glass properties | | Glass transition temperature Tg (° C.) | 495 | 456 | 495 | 452 | 448 | 480 | 475 | 466 | 448 |
| | | Sag temperature Ts (° C.) | 540 | 495 | 541 | 491 | 489 | 525 | 520 | 519 | 497 |
| | | Refractive index (nd) | 1.834 | 1.811 | 1.872 | 1.808 | 1.804 | 1.821 | 1.805 | 1.845 | 1.889 |
| | | Abbe's number (νd) | 26 | 27 | 24 | 28 | 28 | 24 | 25 | 23 | 22 |

*Amounts of Cl anionic component represent amount ratios of Cl in glass raw materials, while it is considered that Cl anionic contents in the obtained optical glasses are nearly the same as those values.

TABLE 3-4

| | | | 67 | 68 | 69 | 70 | 71 | 72 | 73 | 74 | 75 |
|---|---|---|---|---|---|---|---|---|---|---|---|
| Glass composition | Cationic % | $PO_{2.5}$ | 24.73 | 25.67 | 25.81 | 25.81 | 26.74 | 25.81 | 25.81 | 25.53 | 25.88 |
| | | $BO_{1.5}$ | 4.30 | 4.28 | 4.30 | 4.30 | 4.28 | 6.45 | 6.45 | 6.38 | 4.31 |
| | | $SiO_2$ | | | | | | | | | 1.08 |
| | | $LiO_{0.5}$ | 19.35 | 19.25 | 21.51 | 19.35 | 22.46 | 21.51 | 19.35 | 22.34 | 22.64 |
| | | $NaO_{0.5}$ | 19.35 | 16.04 | 13.98 | 11.83 | 12.83 | 13.98 | 16.13 | 12.77 | 12.94 |
| | | $KO_{0.5}$ | | 2.14 | 2.15 | 2.15 | 2.14 | 2.15 | 2.15 | 2.13 | 2.16 |
| | | BaO | 1.08 | | 1.08 | 1.08 | 0.53 | 1.08 | 1.08 | 0.53 | 0.81 |
| | | ZnO | 1.08 | 1.07 | 1.08 | | 0.53 | 1.08 | 1.08 | | |
| | | SrO | | | | | | | | | |
| | | $AlO_{1.5}$ | | | | | | | | | |
| | | $YO_{1.5}$ | | | | | | | | | |
| | | $BiO_{1.5}$ | 5.38 | 6.42 | 4.30 | 8.60 | 4.28 | 3.23 | 3.23 | 4.26 | 4.31 |
| | | $TiO_2$ | 2.69 | 2.67 | 2.69 | 3.23 | 2.67 | 2.69 | 2.69 | 2.93 | 3.23 |
| | | $NbO_{2.5}$ | 19.35 | 19.25 | 20.43 | 20.43 | 20.32 | 19.35 | 19.35 | 20.21 | 19.95 |
| | | $WO_3$ | 2.69 | 3.21 | 2.69 | 3.23 | 3.21 | 2.69 | 2.69 | 2.93 | 2.70 |
| | Anionic % | Cl* | 0.20 | 0.20 | 0.20 | 0.20 | 0.20 | 0.20 | 0.20 | 0.20 | 0.20 |
| Glass properties | | Glass transition temperature Tg (° C.) | 443 | 442 | 452 | 461 | 457 | 450 | 451 | 455 | 458 |
| | | Sag temperature Ts (° C.) | 492 | 493 | 504 | 505 | 506 | 503 | 505 | 507 | 509 |
| | | Refractive index (nd) | 1.851 | 1.860 | 1.850 | 1.900 | 1.850 | 1.827 | 1.824 | 1.850 | 1.850 |
| | | Abbe's number (νd) | 22 | 23 | 23 | 22 | 23 | 24 | 24 | 23 | 23 |

*Amounts of Cl anionic component represent amount ratios of Cl in glass raw materials, while it is considered that Cl anionic contents in the obtained optical glasses are nearly the same as those values.

As shown in Tables 1-1, 1-2, 1-3, 2-1, 2-2, 3-1, 3-2, 3-3 and 3-4, all of the optical glasses had intended refractive indices, Abbe's numbers and glass transition temperatures, and they exhibited excellent low-temperature softening properties and meltability and were suitable as optical glasses for precision press-molding.

A refined and homogenized glass having a composition shown in Table 1-1, 1-2, 1-3, 2-1, 2-2, 3-1, 3-2, 3-3 or 3-4 was caused to flow out of a pipe made of a platinum alloy at a constant flow rate, the pipe being temperature-adjusted in a temperature range in which the glass could be caused to flow out stably without undergoing devitrification. And, a molten glass gob having a weight of an intended preform was separated by dropping or by a method in which the forward end of the molten glass flow was received with a support and the support was rapidly moved downward to separate a glass gob. Each of the thus-molten glass gobs was received with a receiving mold having a gas-ejecting port in its bottom, and each glass gob was shaped into a press-molding preform while the glass gobs were caused to float by ejecting a gas from the gas-ejecting port. The preforms were shaped in the form of a sphere or a flattened sphere by adjusting and setting the time interval for separation of molten glass. The weights of the thus-obtained preforms were precisely in agreement with the corresponding set values, and all of the preforms had smooth surfaces.

In these cases, the returning back of any glass melt from the outlet of the pipe made of the platinum alloy to wet the outer circumferential surface of the pipe was not observed.

Further, as another method, the entire surface of each of shaped spherical preforms was polished by a known method to remove the entire surface layer each, whereby optically uniform preforms were obtained.

Further, as another method, glass melts were cast into casting molds to shape them in the form of a sheet glass or a columnar rod each and these shaped glasses were annealed. Then, they were cut and the surfaces of the resultant glass pieces were ground and polished to give preforms whose entire surfaces were smooth.

In any one of these methods, the returning back of any glass melt from the outlet of the pipe made of the platinum alloy to wet the outer circumferential surface of the pipe was not observed.

The thus-obtained preforms were precision press-molded with a press machine shown in FIG. 1, to give aspherical lenses. Specifically, a preform 4 was placed between a lower mold member 2 and an upper mold member 1 which constituted a press mold together with a sleeve member 3, then, a nitrogen atmosphere was introduced into a quartz tube 11, and a heater 12 is electrically powered to heat an inside of the quartz tube 11. The temperature in the press mold was set at a temperature at which a glass to be molded exhibited a viscosity of $10^8$ to $10^{10}$ dPa·s, and while this temperature was maintained, the upper mold member 1 was pressed by moving a pressing rod 13 downward to press the preform set in the press mold. The pressing was carried out under a pressure of 8 MPa for 30 seconds. After the pressing, the pressing pressure was removed, the glass molded product obtained by the press-molding was gradually cooled to a temperature at which the above glass exhibited a viscosity of $10^{12}$ dPa·s or higher in a state where the lower mold member 2 and the upper mold member 1 were in contact with each other. Then, the glass molded product was rapidly cooled to room temperature and then taken out of the press mold to give an aspherical lens. The aspherical lenses obtained in the above manner had remarkably high surface accuracy.

In FIG. 1, reference numeral 9 indicates a support rod, reference numeral 10 indicates a lower mold member-sleeve member holder, and reference numeral 14 indicates a thermocouple.

The aspherical lenses obtained by the precision press-molding were provided each with an anti-reflection film as required.

Then, preforms that were same as the above preforms were precision press-molded by other method. In this method, while a preform was caused to float, the preform was pre-heated to a temperature at which a glass constituting the preform exhibited a viscosity of $10^8$ dPa·s. Separately, a press mold having an upper mold member, a lower mold member and a sleeve member was heated up to a temperature at which the glass constituting the above preform exhibited a viscosity of $10^9$ to $10^{12}$ dPa·s, and the above pre-heated preform was introduced into the cavity of the press mold to carry out precision press-molding of the preform at a pressure of 10 MPa. Upon the initiation of the pressing, the cooling of both the glass and the press mold was initiated, and the cooling was continued until the molded glass had a viscosity of $10^{12}$ dPa·s or more, and then the molded product was taken out of the mold to give an aspherical lens. The aspherical lenses obtained in the above manner were lenses having remarkably high surface accuracy.

The aspherical lenses obtained by the precision press-molding were provided each with an anti-reflection film as required.

In the above manner, optical elements formed of the glasses having high internal quality were highly productively and highly accurately obtained.

INDUSTRIAL UTILITY

In the fluorophosphate glass and phosphate glass of the present invention, a proper amount of a halide having a halogen element selected from chlorine, bromine or iodine has been introduced into their glass raw materials, so that their returning back and wetting of the outer circumferential surface of a pipe made of platinum can be decreased and they can be obtained as high-quality ones.

The invention claimed is:

1. A phosphate glass comprising, by cationic %, 15 to 40% of $PO_{2.5}$, 3 to 30% of $NbO_{2.5}$, 0 to 15% of $TiO_2$, 0 to 30% of $WO_3$, 0 to 15% of $BiO_{1.5}$, 0 to 25% of $BO_{1.5}$, 0 to 20% of BaO, 0 to 10% of ZnO, 0 to 10% of MgO, 0 to 10% of CaO, 0 to 10% of SrO, 5 to 30% of $LiO_{0.5}$, 0 to 30% of $NaO_{0.5}$, 0 to 15% of $KO_{0.5}$, 0 to 10% of $AlO_{1.5}$, 0 to 10% of $SiO_2$, 0 to 10% of $LaO_{1.5}$, 0 to 10% of $GdO_{1.5}$, 0 to 10% of $YbO_{1.5}$, 0 to 10% of $ZrO_2$ and 0 to 10% of $TaO_{2.5}$ and a fluorine is present in an amount of less than 25% by anionic %, which is produced from a glass raw material containing 0.1 to 5%, by anionic %, of a halide containing a halogen element selected from chlorine, bromine or iodine.

2. A precision press-molding preform formed of the phosphate glass recited in claim 1.

3. An optical element formed of the phosphate glass recited in claim 1.

4. A process for the production of an optical element formed of a phosphate glass, which comprises heating the precision press-molding preform recited in claim 2 and carrying out precision press-molding thereof.

* * * * *